United States Patent
Tang et al.

(10) Patent No.: US 10,558,857 B2
(45) Date of Patent: Feb. 11, 2020

(54) VISUAL FEEDBACK OF PROCESS STATE

(71) Applicant: A9.com, Inc., Palo Alto, CA (US)

(72) Inventors: Peiqi Tang, Santa Clara, CA (US);
Andrea Zehr, Palo Alto, CA (US);
Rupa Chaturvedi, Menlo Park, CA (US); Yu Lou, Mountain View, CA (US); Colin Jon Taylor, Orinda, CA (US); Mark Scott Waldo, Richmond, CA (US); Shaun Michael Post, San Mateo, CA (US)

(73) Assignee: A9.COM, INC., Palo Alto, CA (US)

( * ) Notice: Subject to any disclaimer, the term of this patent is extended or adjusted under 35 U.S.C. 154(b) by 0 days.

(21) Appl. No.: 15/911,850

(22) Filed: Mar. 5, 2018

(65) Prior Publication Data

US 2019/0272425 A1 Sep. 5, 2019

(51) Int. Cl.
| | |
|---|---|
| *G06T 19/00* | (2011.01) |
| *G06K 9/00* | (2006.01) |
| *G06K 9/62* | (2006.01) |
| *G06T 13/80* | (2011.01) |
| *G06K 9/46* | (2006.01) |
| *G06F 16/532* | (2019.01) |
| *G06F 16/583* | (2019.01) |

(52) U.S. Cl.
CPC ....... *G06K 9/00671* (2013.01); *G06F 16/532* (2019.01); *G06F 16/5838* (2019.01); *G06K 9/46* (2013.01); *G06K 9/6232* (2013.01); *G06T 13/80* (2013.01); *G06T 19/006* (2013.01)

(58) Field of Classification Search
None
See application file for complete search history.

(56) References Cited

U.S. PATENT DOCUMENTS

| | | | |
|---|---|---|---|
| 2010/0121480 A1* | 5/2010 | Stelzer | B65G 1/137 700/215 |
| 2013/0234850 A1* | 9/2013 | Lee | A61B 5/02 340/539.12 |

OTHER PUBLICATIONS

Mark Dawson, "ARKit by Example—Part 2: Plane Detection + Visualization", https://blog.markdaws.net/arkit-by-example-part-2-plane-detection-visualization-10f05876d53, Jun. 11, 2017. (Year: 2017).*

International Search Report and Written Opinion issued in Application No. PCT/US19/20499 dated Mar. 4, 2019.

(Continued)

*Primary Examiner* — Nicholas R Wilson
(74) *Attorney, Agent, or Firm* — Hogan Lovells US LLP

(57) ABSTRACT

Various embodiments of the present disclosure provide systems and method for visual search and augmented reality, in which an onscreen body of visual markers overlayed on the interface signals the current state of an image recognition process. Specifically, the body of visual markers may take on a plurality of behaviors, in which a particular behavior is indicative of a particular state. Thus, the user can tell what the current state of the scanning process is by the behavior of the body of visual markers. The behavior of the body of visual markers may also indicate to the user recommended actions that can be taken to improve the scanning condition or otherwise facilitate the process. In various embodiments, as the scanning process goes from one state to another state, the onscreen body of visual markers may move or seamlessly transition from one behavior to another behavior, accordingly.

20 Claims, 12 Drawing Sheets

(56) References Cited

OTHER PUBLICATIONS

Graham Taylor, "Improving Consumer Buying Experience With In Store Shoe Recognition", dated May 10, 2017 (cited in ISR).
Apple, "Handling 3D Interaction and UI Controls in Augmented Reality Placing Virtual Objects", dated Jan. 29, 2018 (cited in ISR).

* cited by examiner

VISUAL FEEDBACK OF PROCESS STATE

BACKGROUND

Users are increasingly utilizing electronic devices to obtain various types of information. For example, a user wanting to purchase a product might access an electronic marketplace in order to search the types of products offered through that marketplace. Unless the user knows an exact brand or style of product that the user wants, however, the user might have to search through hundreds or thousands of different products using various options to attempt to locate the type of product in which the user is interested. If the user is interested in a product of a specific type, the user might have no option but to sift through these results. Further, products in an electronic catalog may be associated with by a finite number of specific keywords or classifications and users may not know the exact keywords to describe the products they are looking for. Thus, technology has been developed that allows a user interested in acquiring information about a product, or to search for similar products, to capture an image of the product and submit the captured image to an object recognition system to obtain information associated with the product or find visually similar products. In some additional scenarios, a user can capture an image of a scene, and a representation of a product can be projected into the scene through augmented reality so the user can visualize the product as a part of the scene.

BRIEF DESCRIPTION OF THE DRAWINGS

Various embodiments in accordance with the present disclosure will be described with reference to the drawings, in which.

DETAILED DESCRIPTION

Figure 1:
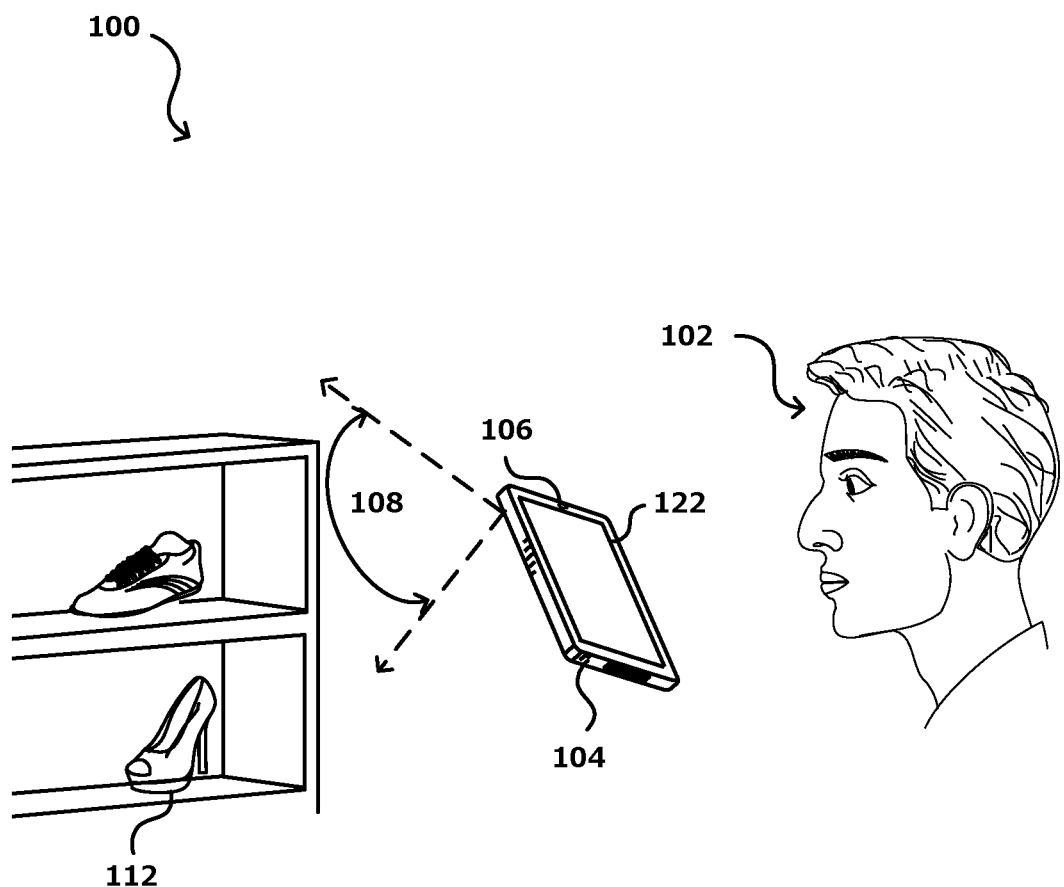
FIG. 1 illustrates an example in which a user can capture an image of an object in an attempt to search for products visually similar to the object, in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches for image recognition. In particular, various embodiments provide visual and intuitive user feedback about the status of an image recognition scanning process through animated visual markers whose behaviors (e.g., movement, color, shape, position) change according to the current state of the image recognition scanning process, thereby letting users know of any adjustments (e.g., lighting, camera position, steadiness) that need to be made as well as keeping users engaged during latency.

For example, in order to initiate a visual search for products in an electronic catalog based on a visually similar physical object, a camera of a computing device such as a smart phone can be used to capture a live camera view (or single images) of a scene including the physical object. Similarly, in order to generate an augmented reality view of a product within a physical space, the camera can be used to capture a live camera view of a scene including the physical space. In order to carry out these visual search and augment reality functions, the image data representing the scene captured the camera is processed using an image recognition techniques in order extract feature data that is used to "understand" the scene, such as the objects or surfaces of interest, and enable the visual search or position the augmented reality product.

As the user scans the scene using the computing device, the image recognition process (e.g., visual search, augmented reality) is carried out on the "backend", whether on the computing device or an associated server. The process may go through several possible states, such as initialization, searching for image features, unstable frame, poor lighting, searching catalog, network connectivity issues, among others. Some of these states (e.g., initialization, searching) may take a certain amount of processing time, thereby causing latency. Some of the states (e.g., unstable frame, poor lighting, connectivity issues) may cause poor scanning conditions, which may be corrected by the user if the user is made aware of such issues. This, it would be advantageous to be able to inform the user of the current state of the scanning process in a visually stimulating and informative manner in order to keep the user engaged during processing latency and also to let the user know if adjustments need to be made to improve scanning conditions.

Thus, various embodiments of the present disclosure provide systems and method for visual search and augmented reality, in which an onscreen body of visual markers (e.g., small animated bubbles) overlayed on the interface signals the current state of an image recognition process (i.e., scanning process). Specifically, the body of visual markers may take on a plurality of behaviors, in which a particular behavior is indicative of a particular state. Thus, the user can tell what the current state of the scanning process is by the behavior of the body of visual markers. The behavior of the body of visual markers may also indicate to the user recommended actions that can be taken to improve the scanning condition or otherwise facilitate the process. In various embodiments, "behavior" of the body of visual markers may refer to any combination of appearance (e.g., color, opacity, size, shape), individual marker motion, collective or organized motion of groups of markers, animations, physics, number and distribution of markers, and the like. In various embodiments, as the scanning process goes from one state to another state, the onscreen body of visual markers may move or seamlessly transition from one behavior to another behavior, accordingly. Although visual search, also known as image-based search, and augmented reality applications are used herein as example applications of the present techniques, many other camera-based applicant can utilized the present techniques, such as parts detection, virtual fashion or makeup, visual credit card detection, barcode scanning, packaging label reading, among others. In some embodiments, a plurality of such applications may be provided, in which a mapping between the various image recognition states and the plurality of virtual marker behaviors is consistent across a plurality of such image recognition processes. Various other applications, processes, and uses are presented below with respect to the various embodiments, each of which improves the operation and performance of the computing device(s) on which they are implemented.

Figure 2:
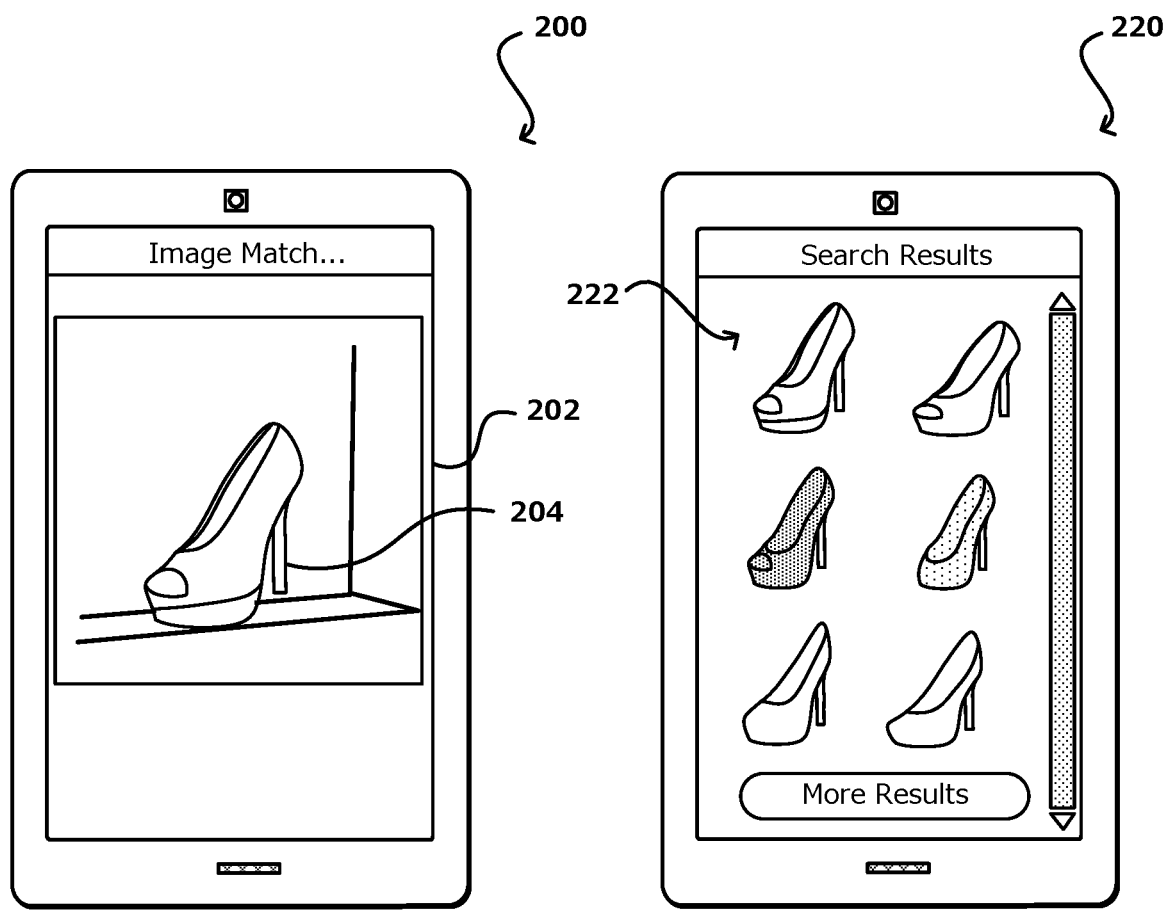
FIG. 2A illustrates an example interface of the computing device capturing an image or live camera view of the object for performing image recognition, in accordance with various embodiments.
FIG. 2B illustrates an example interface of the computing device providing search results based on the captured image of the object, in accordance with various embodiments.

FIG. 1 illustrates an example scenario 100 in which a user 102 can capture an image of an object in an attempt to search for products visually similar to the object, in accordance with various embodiments. Although a portable computing device (e.g., a smart phone or tablet computer) is shown, it should be understood that various other types of electronic devices that are capable of determining and processing input can be used as well in accordance with various embodiments. These devices can include, for example, notebook computers, personal data assistants, e-book readers, cellular phones, video gaming consoles or controllers, smart televisions, set top boxes, a wearable computer (e.g., a smart watch or glasses), and portable media players, among others. In this example, the computing device 104 has at least one camera 106 (or other image capture sensor or element) operable to perform functions such as image and/or video capture. Each camera may be, for example, a charge-coupled device (CCD), a motion detection sensor, or an infrared sensor, or can utilize another appropriate image capturing technology. The user can position the device such that one or more items of interest 112 are within a field of view 108 of at least one camera 106 on the computing device. The camera might capture video, such that a "live" view of the captured video information can be displayed on a display screen of the computing device, as illustrated in FIG. 2A. In other embodiments, the camera might capture a still image 124 showing a representation of the item(s) of interest. In at least some embodiments, the image and/or a frame of the video can be analyzed, such as by analyzing on the device or uploading across a network to a service for analyzing image content.

FIG. 2A illustrates an example interface of the computing device 200 capturing an image or live camera view of an object 204 for performing image recognition, in accordance with various embodiments. In various embodiments, the interface 202 provides a live camera view of the scene including the object 204 captured by the camera of the computing device 200. Various image recognition processes and techniques can be utilized to process and analyze the image data captured by the camera to perform the above-described visual search or augment reality product view. In some embodiments, the image may undergo some pre-processing, for example, to sharpen, adjust color factors, etc., to improve the quality of the image data. For example, the image may be enhanced to show a color of the item that is closer to what would be perceived by a human looking at the item in real life. The image may also be enhanced such that certain features such as contours, lines, textures, and text occurring in the actual item are more apparent, either visually or in computer-readable data format.

For example, in some instances, lighting conditions that exist at the time the image is captured can affect the temperature or intensity of a particular color being captured as well as the contrast between certain contours. For example, a particular shade of blue, as captured in an image, may be perceptually different if imaged on a cloudy day as opposed to being imaged on a sunny day. In some embodiments, the user can interact with the software application to select a lighting model that is calibrated to the type of lighting conditions existing at the time the image is being captured. For example, the user can select between lighting models that are calibrated for fluorescent light, cloudy weather, sunny weather, natural light, etc. The colors captured in the image can be adjusted, e.g., recalibrated, accordingly based on the selected lighting model.

In some embodiments, International Standards Organization (ISO) settings for measuring sensitivity to light can be used to automatically adjust color settings. For example, a camera may automatically adjust its ISO settings depending on lighting conditions that were determined by a light sensor in the camera. A lower ISO setting can indicate high lighting conditions while a higher ISO setting can indicate low lighting conditions. This observation can be used by, for example, the website or application executing on the user device to adjust the color settings so that the colors in the captured image are visually similar to colors that were actually perceived by the user. In some embodiments, the website or application may provide these settings or may automatically apply certain such settings image when capturing the image as determined to be optimal given a detect ambient lighting condition and the subject of the image.

Once the image has been captured, and in some embodiments, after it has undergone some pre-processing as mentioned above, attributes or features of the scene, such as objects, surfaces, and spaces, be determined from the image data through various models including various computer-vision and image processing techniques and processes. Machine learning models, for example, such as neural networks and other machine leaning-based approaches, can be trained on appropriate training data for detecting and recognizing various types of objects and object features. In some embodiments the neural network can be trained using images from a catalog that include metadata, description, classification, or other data that can be used to identify various objects and object features. For example, in some embodiments, localization can then be performed to determine the relevant region of the scene associated with an object (including spaces or surfaces) of interest. In some embodiments, a conventional training process can be used with the deep neural network, although various other approaches can be used that may provide particular advantages as well. In some embodiments the fully connected layers of the network can also be analyzed without need to analyze the classification result of the final layer. Intermediate features from the network can be used for similarity calculations in at least some embodiments. The techniques for determining attributes may include machine-learning based approaches such as those utilizing convolutional neural networks, feature detection and matching (e.g., filtering) techniques, or a combination of both and/or other techniques. Details regarding such models and how the models may be trained or configured to provide such functionality is presented in further detail below so as not to obscure from the present discussion. In various embodiments of a visual search application, after the object of interest in the scene has been identified and object recognition techniques have been performed to extract certain feature data associated with the object, the feature data can be used to identify products in an electronic catalog that are visually similar to the object of interest. This may be performed through various techniques. For example, in some embodiments, a K-Nearest Neighbors (KNN) technique may be employed, in which a feature vector of the object of interest may be compared to feature vectors of products (i.e., product images) in the electronic catalog, and a measure of visual similarity between the object of interest and a product is determined based on a distance between their respective feature vectors. The products may then be ranked and/or selected as search results based on the determined visual similarity. This is illustrated in FIG. 2B, which illustrates an example interface of the computing device 220 providing search results 222 based on the captured image of the object, in accordance with various embodiments.

In various embodiments of an augmented reality product view application, after a surface or space in scene is identified through image recognition, a graphical rendering of a product may be generated and superimposed onto a system or user selected position of the scene. For example, the graphical rendering of the product may be sized in proportion to other objects in the scene and positioned to provide the illusion the object being placed on a certain surface in the scene. In some embodiments, a user may drag the graphical rendering of the product to place it in different positions or turn the graphical rendering to view different angles of the product. Thus, the size, position, or viewing angle of the graphical rendering of the product may change according to the user input.

Figure 3:
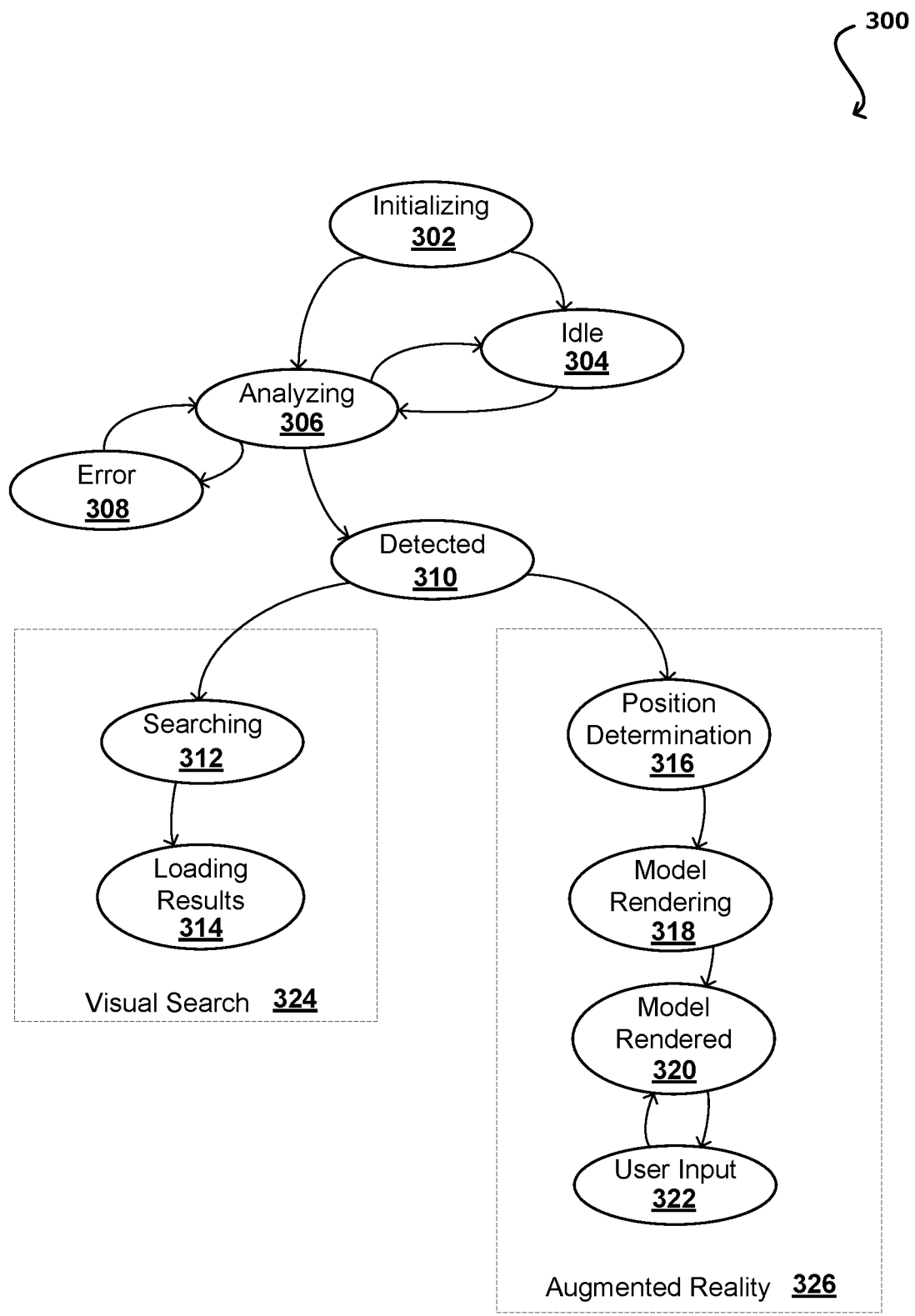
FIG. 3 illustrates an example pipeline of an image recognition process, in accordance with various embodiments.

FIG. 3 illustrates an example pipeline 300 of an image recognition process, in accordance with various embodiments. During an image recognition process such as a visual search process or an augmented reality product viewing process, various states may occur, some of which are mentioned above. For example, an initialization state 302 occurs when a user opens the camera function within a visual search or augmented reality application, during which image data started to be received and the algorithm is preparing to analyze the image data. During this state, it would be beneficial to indicate to the user that the function has been initialized. In some embodiments, the image recognition process may go into an idle state, which signals that the live camera view of the scene, or the scanning condition, is not good enough to perform image analysis of the image data. For example, the image recognition process may go into the idle state if the frame or camera is not steady enough and the camera focus is unable to "lock on" to certain objects in the camera view. The image recognition process may also go into the idle state if there is not sufficient lighting, among other poor image conditions that prevent proper image analysis. If the image conditions are adequate, the image recognition process may go into the analyzing state 306, in which the frame is stabilized and the image analysis engine begins to analyze the image data to detect for objects, such as certain corners, edges, or other features. It would be beneficial to visually indicate to the user that the system is working and that image is being analyzed. In some embodiments, multiple objects may be detected. Thus, it would be beneficial to indicate which objects are being picked up by the camera so the use can select which object in the camera view to focus on.

In some embodiments, the image recognition process may go into an error state 308, in which the process is disrupted. This may be caused by connectivity issues or other client-side, server-side, or channel-based system issues that cause the process to be paused or stopped. The image recognition process may go into the error state 308 at any points, and in some embodiments, when connectivity is recovered, the process may resume the state prior to entering the error state 308, which in this example is the analyzing state 306. The process can then go into the detected state 310, in which an object of interest in the camera view has been fully detected and its feature extracted. This may be different types of objects in different applications and use cases. For example, in a visual search application, the detected object may be an object that the user wants to use as a visual search query to search for visually similar products.

In an augmented reality application, the detected object may be a surface onto which an augmented reality model can be positioned onto. Specifically, for example, for a visual search application 324, after the object of interest has been detected, the image recognition process may go into a searching state 312, in which a database of product images is being searched based on visual similarity to the detected object. Then, the results are loaded onto the user device in a loading results state 314. In an augmented reality application 326, after a surface or space is detected 310, the process goes into a position determination state 316, in which a position on the surface is determined for rendering the augment reality model. In some embodiments, the position is determined automatically or may be determined based on a user selected position. The process then goes into a model rendering state 318, during which the model is being rendered at the determined position. When the model is fully rendered, the process goes into a model rendered state 320, which shows the rendered model. In some embodiments, if a user input is received, such as a touch or a model manipulation, the process goes into a user input state 322, in which the model is responsive to the user input.

Figure 4A:
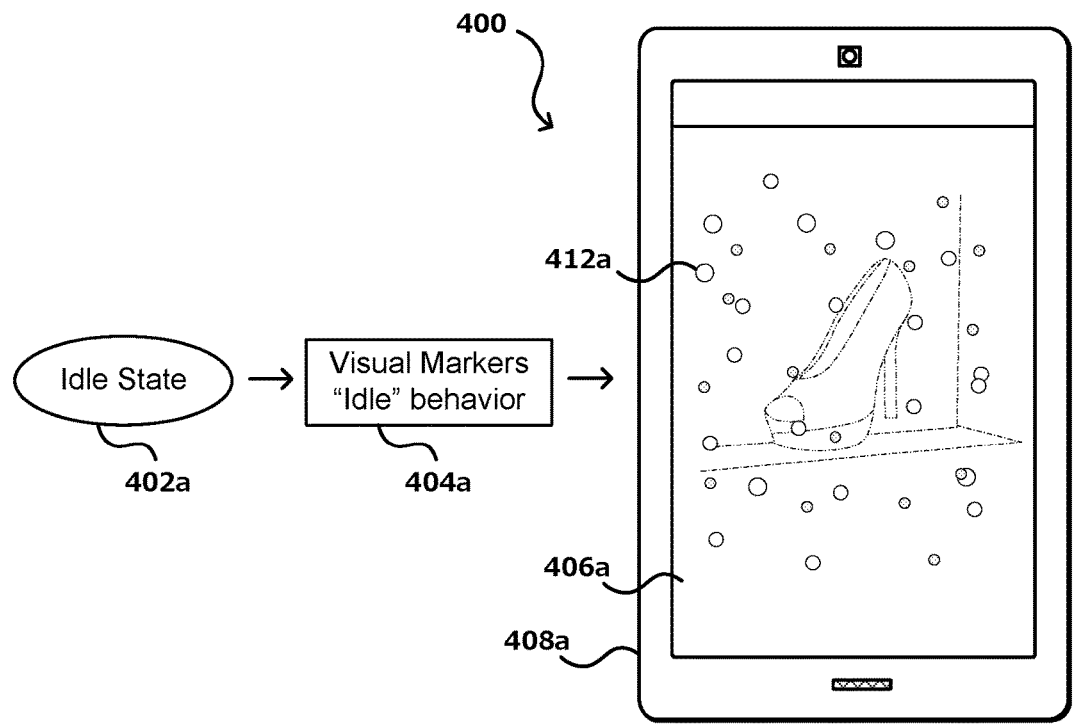
FIG. 4A illustrates an example interface showing a live camera view and a body of visual markers exhibiting "idle" behavior, in accordance with various embodiments of the present disclosure.

FIG. 4A illustrates an example interface 400 showing a live camera view and a body of visual markers exhibiting "idle" behavior, in accordance with various embodiments. As mentioned, in some embodiments, the image recognition process may go into an idle state 402a, which signals that the live camera view of the scene, or the scanning condition, is not good enough to perform image analysis of the image data. For example, the image recognition process may go into the idle state if the frame or camera is not steady enough and the camera focus is unable to "lock on" to certain objects in the camera view. The image recognition process may also go into the idle state if there is not sufficient lighting, among other poor image conditions that prevent proper image analysis. When the image recognition process is in the idle state 402a, the body of visual markers are configured to exhibit an "idle" behavior 404a, which corresponds to the idle state 402a. For example, visual markers may be small bubbles overlayed on the live camera view, and the "idle" behavior is illustrated on the interface 406a. In this example, the "idle" behavior of the visual markers may be described as the visual markers 412a being scattered across the live camera view 406a, as shown on the user device 408b of FIG. 4A. In other embodiments of the "idle behavior", the visual markers may have a different appearance or style.

Figure 4B:
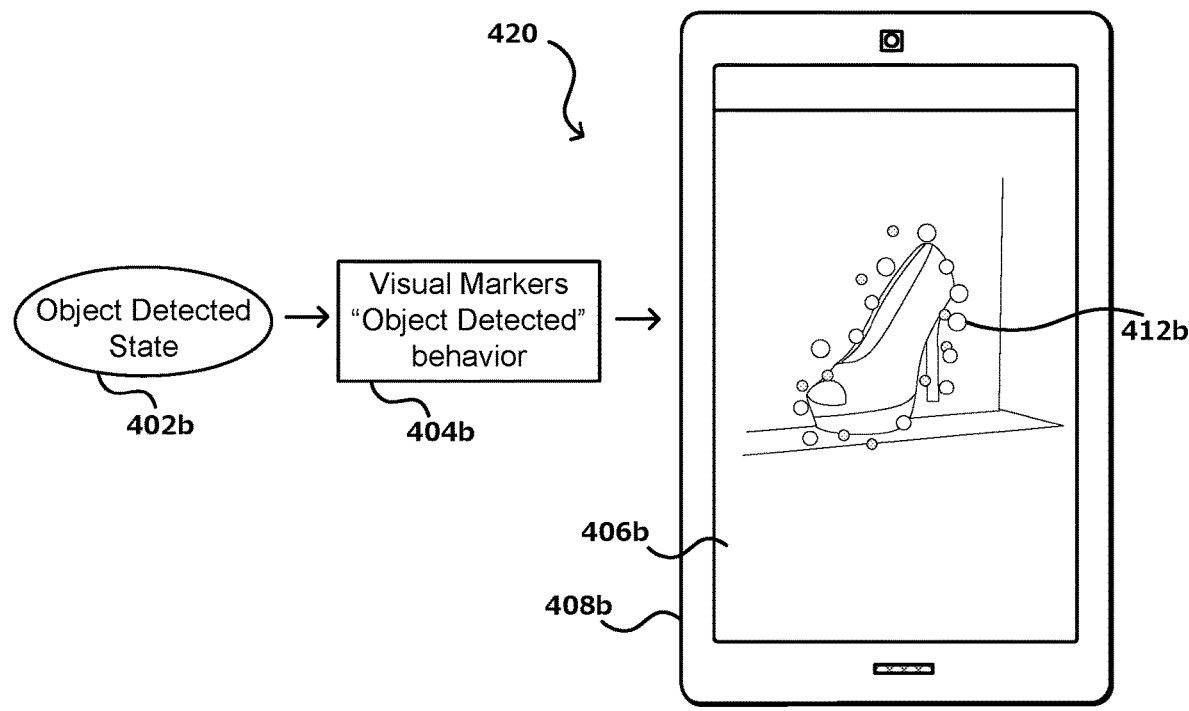
FIG. 4B illustrates an example interface showing a live camera view and a body of visual markers exhibiting "object detected" behavior, in accordance with various embodiments.

FIG. 4B illustrates an example interface 420 showing a live camera view and a body of visual markers exhibiting "object detected" behavior, in accordance with various embodiments. The process can go into an object detected state 402b, in which an object 410b of interest in the camera view has been fully detected and its features being extracted. When the image recognition process is in the object detected state 402b, the body of visual markers are configured to exhibit an "object detected" behavior 404b, which corresponds to the object detected state 402b. For example, the "object detected" behavior 404b may illustrate the visual markers 412b surrounding the detected object 410b in the live camera view 406b, as shown on the user device 408b of FIG. 4B. In other embodiments of the "object detected", the visual markers may have a different appearance or style.

Figure 4C:
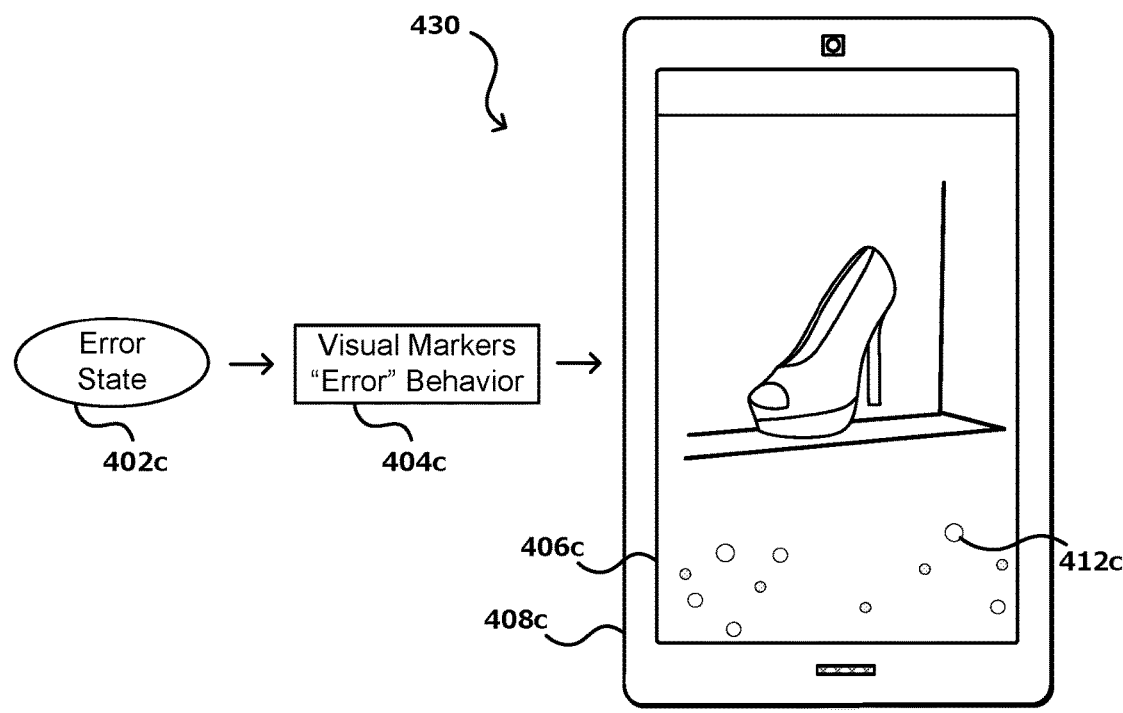
FIG. 4C illustrates an example interface showing a live camera view and a body of visual markers exhibiting "error" behavior, in accordance with various embodiments.

FIG. 4C illustrates an example interface 430 showing a live camera view and a body of visual markers exhibiting "error" behavior, in accordance with various embodiments. In some embodiments, the image recognition process may go into an error state 402c, in which the process is disrupted. This may be caused by connectivity issues or other client-side, server-side, or channel-based system issues that cause the process to be paused or stopped. When the image recognition process is in the error state 402c, the body of visual markers are configured to exhibit an "error" behavior 404c, which corresponds to the error state 402c. For example, the "error" behavior 404c may illustrate the visual markers 412c falling from the object and out of view, eventually leaving the live camera view 406c, as shown on the user device 408c of FIG. 4C. In other embodiments of the "error" behavior, the visual markers may have a different appearance or style.

Figure 4D:
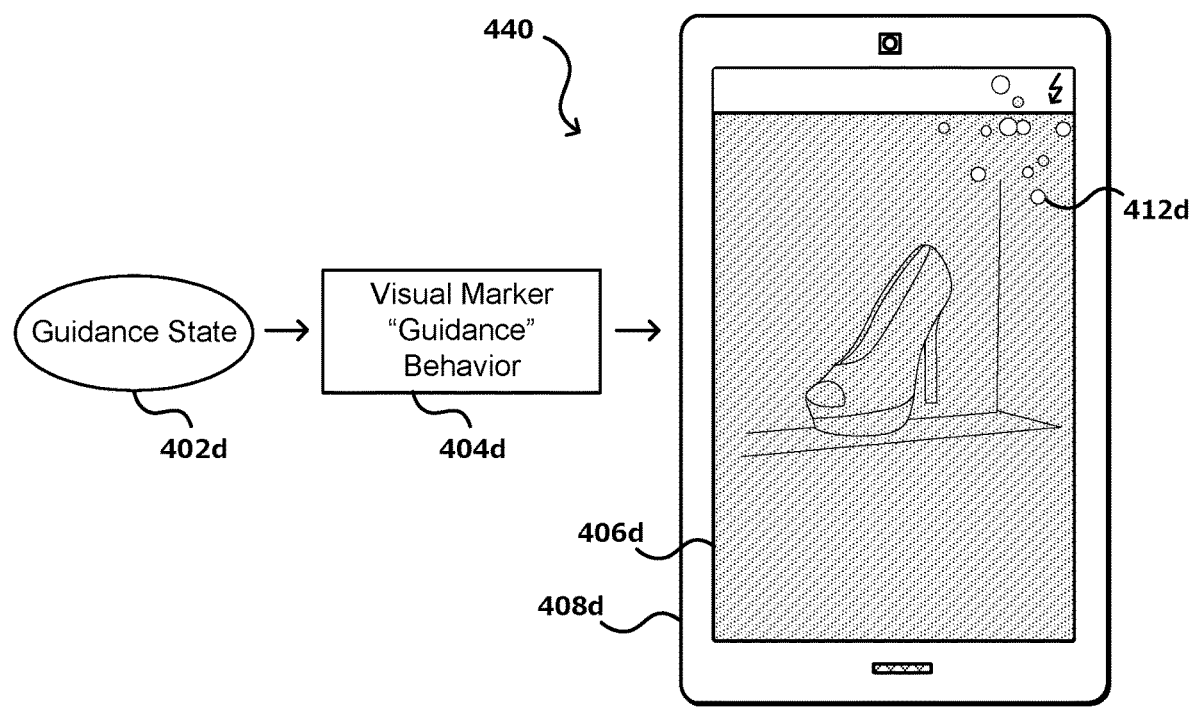
FIG. 4D illustrates an example interface showing a live camera view and a body of visual markers exhibiting "guidance" behavior, in accordance with various embodiments.

FIG. 4D illustrates an example interface 440 showing a live camera view and a body of visual markers exhibiting "guidance" behavior, in accordance with various embodiments. The process may go into a guidance state 402d, during which an adjustment needs to be made to improve, for example, camera view quality. For example, it may be detected that the ambient lighting is too low and the user should turn on the flashlight function. Thus, it would be beneficial to visually guide the user to take such an action. When the image recognition process is in the object detected state 402d, the body of visual markers are configured to exhibit a "guidance" behavior 404d, which corresponds to the guidance state 402d. For example, the "guidance" behavior 404d may illustrate the visual markers 412d gathered in the position on the interface 406d to highlight an interface element, such as a flashlight button 414, in order to bring the user's attention to the element, as shown on the user device 408d of FIG. 4D. In other embodiments of the "guidance", the visual markers may have a different appearance or style.

Figure 4E:
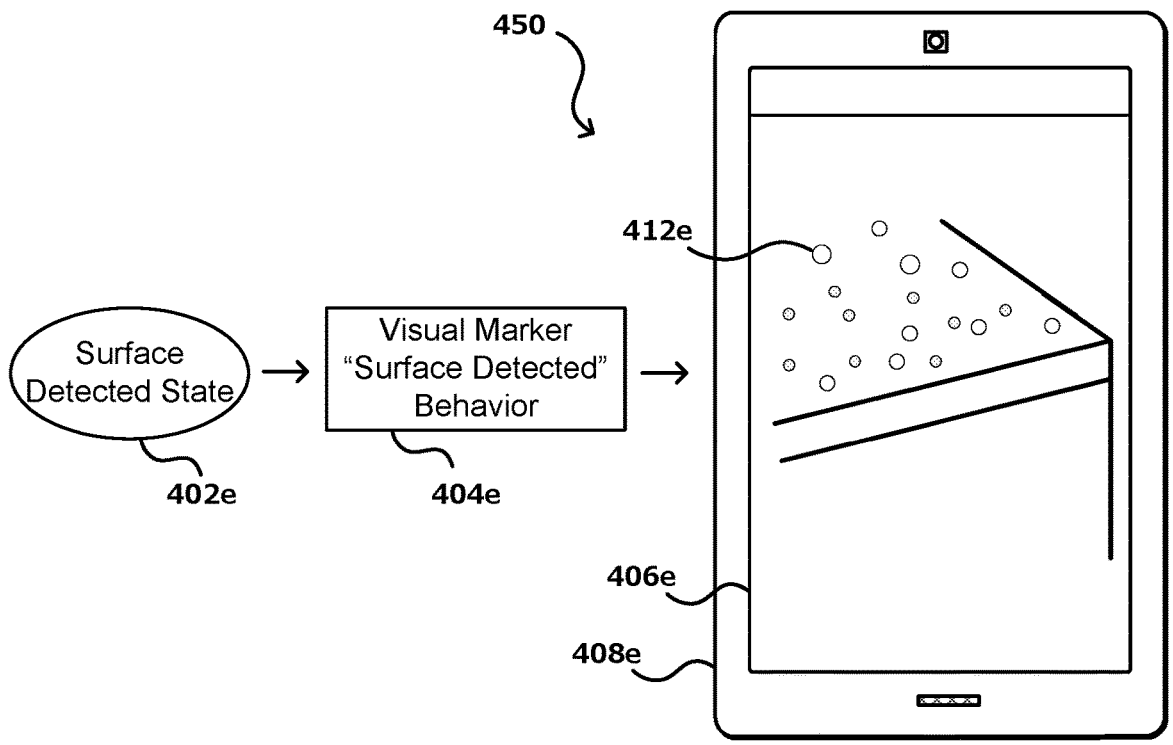
FIG. 4E illustrates an example interface showing a live camera view and a body of visual markers exhibiting "surface detected" behavior in an augmented reality application, in accordance with various embodiments.

FIG. 4E illustrates an example interface 450 showing a live camera view and a body of visual markers exhibiting "surface detected" behavior in an augmented reality application, in accordance with various embodiments. The process can then go into the surface detected state 402e, in which an object of interest in the camera view has been fully detected and its feature extracted. This may be different types of objects in different applications and use cases. In an augmented reality application, the detected object may be a surface onto which an augmented reality model can be positioned onto. When the image recognition process is in the surface detected state 402e, the body of visual markers 412e are configured to exhibit an "surface detected" behavior 404e, which corresponds to the surface detected state 402e. For example, the "surface detected" behavior 404e may illustrate the visual markers scattered across the detected surface 410e in the live camera view 406e, as shown on the user device 408e of FIG. 4E. In other embodiments of the "error" behavior, the visual markers may have a different appearance or style.

Figure 4F:
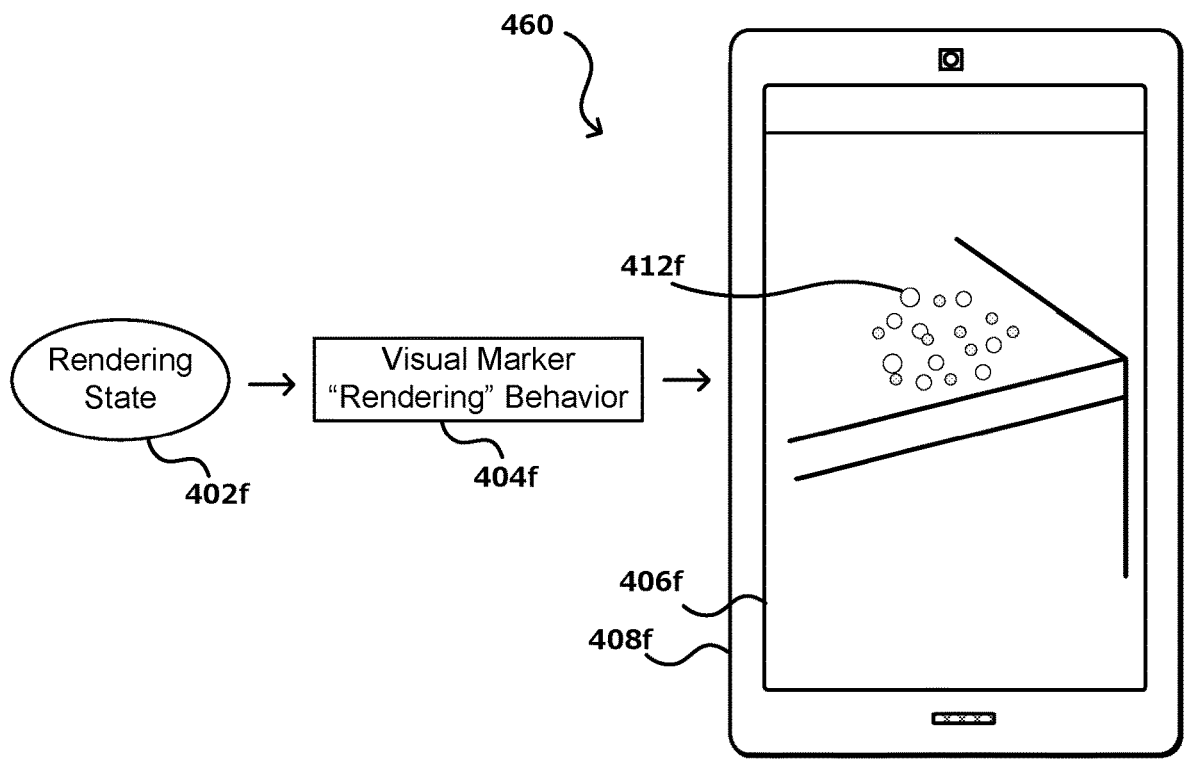
FIG. 4F illustrates an example interface showing a live camera view and a body of visual markers exhibiting "rendering" behavior in an augmented reality application, in accordance with various embodiments.

FIG. 4F illustrates an example interface 460 showing a live camera view and a body of visual markers exhibiting "render" behavior in an augmented reality application, in accordance with various embodiments. The process may go into a model rendering state 402f, during which the model is being rendered at a certain position. In some embodiments, the rendering may take some time, causing some latency. Thus, it would be beneficial to indicate visually to the user that the rendering is happened and the model will appear soon. When the image recognition process is in the object detected state 402f, the body of visual markers are configured to exhibit a "model rendering" behavior 404f, which corresponds to the model rendering state 402f For example, the "model rendering" behavior 404f may illustrate the visual markers 412f gathered in the position in which the model will be rendered, in the live camera view 406f, as shown on the user device 408f of FIG. 4F. In other embodiments of the "object detected", the visual markers may have a different appearance or style.

As discussed, the visual markers are able to change their behavior and movement according to different image recognition process states. The examples above illustrated different stages of the image recognition process. However, an image recognition process may include other possible states, in addition to stages, such as those based on the type of scenes detected, and the objects detected. For example, detecting an object in a visual search process and detecting a surface in an augmented reality process may be the same stage in a general image recognition process. However, because the scenes are different, the two may be referred to as two different states, and hence elicit different behavior from the visual markers. Additional examples of scene types include cluttered scene, blurry scene, empty scene, among others, which may elicit different behaviors from the visual markers as a means of providing feedback and indication to the user. Although visual search, also known as image-based search, and augmented reality applications are used herein as example applications of the present techniques, many other camera-based applicant can utilized the present techniques, such as parts detection, virtual fashion or makeup, among others. For example, the present techniques may be utilized in image processing of credit cards, barcodes, cityscapes, packaging labels, and the like.

In various embodiments, the behavior of the visual markers may be based on the particular application and expected object to be captured by the camera. For example, in applications where the camera is used to capture an image of an item of a known shape, such as a credit card, a shipping label, a sheet of paper, a barcode, among others, the body of visual markers may form a frame or outline of the known shape. This may provide a guide to the user to position the camera with respect to the object such that the object is substantially aligned with for fits within the frame formed by the visual markers, as it appears on the screen of the device. This allows for consistency and higher quality of image captures, enhancing for image recognition of the object.

As mentioned, the behavior of the visual markers includes parameters such as size, shape, color, and opacity of individual visual markers, size and shape of the body of visual markers, among others. In various embodiments, the behavior of the visual markers may also include animations. For example, the size, shape, color, and opacity of individual visual markers may change over time, such as by default over the source of the onscreen lifecycle of a marker, or as certain things happen, or in response to the occurrence of an event. For example, an individual marker may have a lifecycle in which the visual marker fades in while growing in size from one to a maximum pixel size and fade out. Different individual visual markers may have offset lifecycles in which the visual markers may be at different points in the lifecycle at a certain time, thereby creating a dynamic and visually engaging experience. In some embodiments, the body of visual markers may be animated collectively, with the animation of individual visual markers being coordinated to bring about animation of the body as a whole.

In various embodiments, and particularly in augmented reality applications, the size of the individual visual markers or the overall size of the body of visual markers may change based on a distance or zoom between the camera and the background surface or space. Thus, perspective can be maintained as the user moves the camera with respect to the background environment. For example, if a user moved a camera closer to a surface or zoomed in such as the surface appears larger on the screen, the visual markers may expand as well and to a corresponding degree, thereby maintaining perspective.

Figure 5:
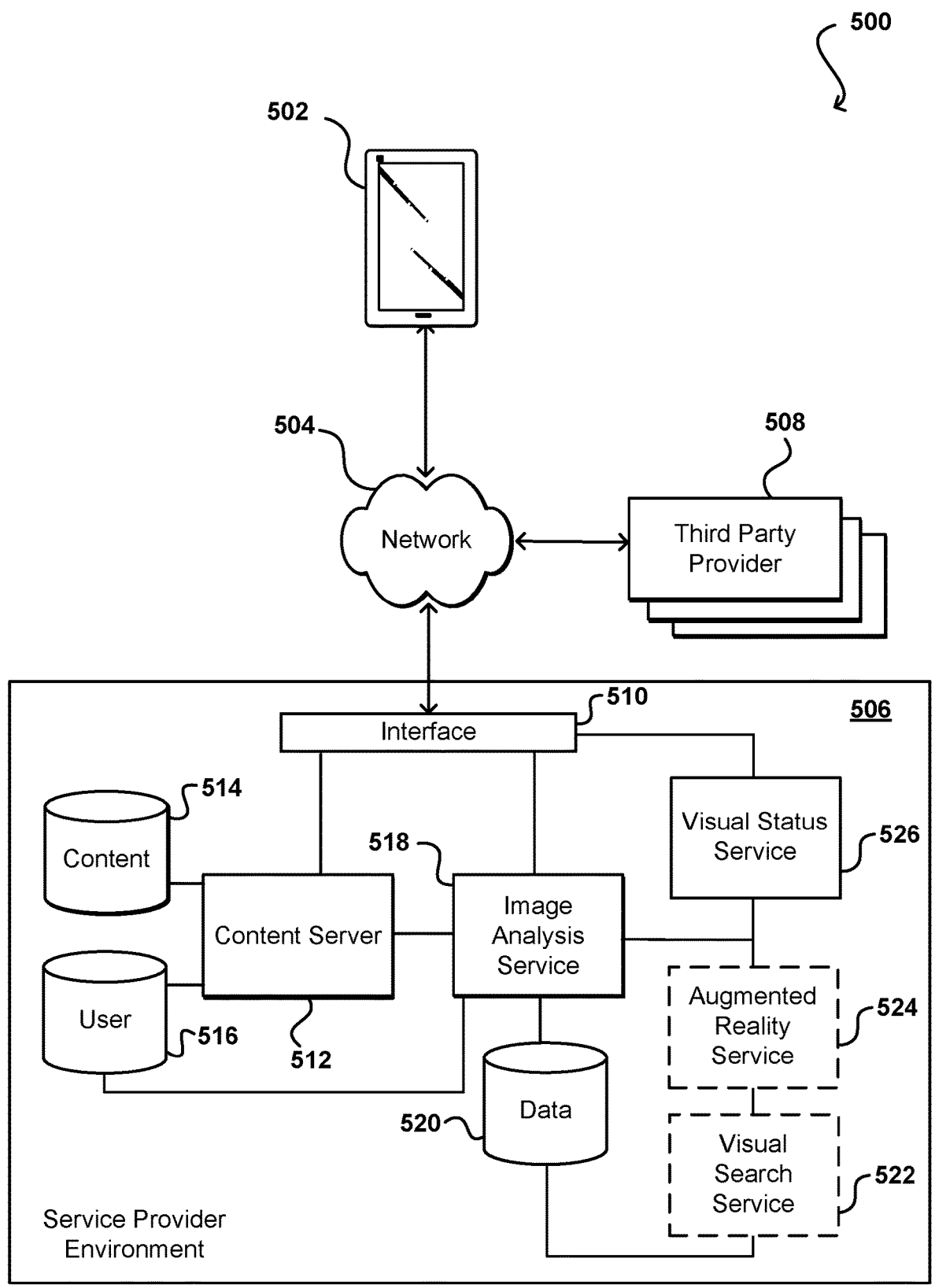
FIG. 5 illustrates an example environment in which various embodiments can be implemented, in accordance with various embodiments.

FIG. 5 illustrates an example environment 500 in which various embodiments can be implemented. In this example, a user is able to capture image data from a live camera view of a scene that includes one or more objects, surfaces, or spaces, using a computing device 502. In various embodiments, the image data can also be of a still image and/or video. An application executing on the computing device 502 or a remote server communicative with the computing device 502 can analyze the image data to perform image recognition on the image data, such as for visual search or augmented reality product viewing. The computing device can send at least a portion of information across at least one appropriate network 504, such as may include the Internet, a local area network (LAN), a cellular network, and the like. The request can be sent to an appropriate service provider 506, as may provide one or more services, systems, or applications for processing such requests. Additional or alternative elements and elements can be used in such a system in accordance with the various embodiments. Accordingly, it should be noted that additional services, providers, and/or elements can be included in such a system, and although some of the services, providers, elements, etc. are illustrated as being separate entities and/or elements, the illustrated arrangement is provided as an example arrangement and other arrangements as known to one skilled in the art are contemplated by the embodiments described herein. As should be understood, each service and/or component can include one or more computing components, such as at least one server, as well as other components known for providing services, as may include one or more APIs, data storage, and other appropriate hardware and software components. It should be understood that, although the services are shown to be part of the provider environment 506 in FIG. 5, that one or more of these identification services might be operated by third parties 508 that offer these services to the provider. In this example, the request is received to a network interface layer 510 of the service provider 506.

The network interface layer can include any appropriate components known or used to receive requests from across a network, such as may include one or more application programming interfaces (APIs) or other such interfaces for receiving such requests. The network interface layer 510 might be owned and operated by the provider, or leveraged by the provider as part of a shared resource or "cloud" offering. The network interface layer can receive and analyze the request, and cause at least a portion of the information in the request to be directed to an appropriate system or service, such as a content server 512 (e.g., a Web server or application server), an image analysis service 518, among other such options. As described, the image analysis service 518 can analyze the image data of the live camera view to determine identify various objects, surfaces, and spaces in the live camera view or scene based on visual features extracted from the image data. In some embodiments, the image analysis service 518 may include a neural network may include a convolutional neural network (CNN). The CNN may be trained to perform image recognition using a diverse set of training images labeled as having certain attributes, such as color, style, length, brand, shape, size, materials, texture, and the like, through which the CNN learns how certain attributes relate to the images to their respect classifications. In some embodiments, neural network may also be trained using training images labeled as not having certain attributes, known as hard negative mining, in order to further train the neural network to distinguish between whether an image is associated with a certain attribute or not. In certain embodiments, training a neural network may involve significant use of computation resources and time, such that this may correspond to a preparatory step to servicing search requests and/or performed relatively infrequently with respect to search request servicing and/or according to a schedule. According to some embodiments, training images, respective labels, and other metadata, can be located in the training database that contains data related to the training and refinement of the classification model, including the neural network.

The neural network may include several learning layers in its architecture. For example, the neural network may include a feature extraction layer. A training image from the training data may be analyzed in the feature extraction layer to extract a feature vector from the network before the classification layer. This feature vector describes the content shown in the image and may be associated with one or more of the attributes the model is trained to determine. This process can be implemented for each of the training images, and the resulting content feature vectors can be stored in a training database. In various embodiments, the resulting content feature vectors can be compressed for improved processing. For example, the content feature vectors generated by the neural network may include content feature vectors that have a large number of dimensions. The dimensions of these object feature vectors can be reduced by applying at least one of Principal Element Analysis (PCA) or Multi-Dimensional Scaling (MDS). Advantageously, such an approach can reduce storage demands and significantly improve latency performance. Additionally, such an approach can remove or at least reduce noise in the transformed space since the tailing dimensions generally correspond to noise and discarding them helps to focus on the useful signal when measuring similarities.

The neural network may be further trained or refined by processing a test image through the neural network without associated attribute labels and validating the neural network's classification of the test image as being associated with various attributes. Specifically, the neural network may receive validation of the classification as correct, incorrect, or in some embodiment, partially correct. The validation can be made by a human annotator or through accessing a stored validation answer associated with the test image. In an embodiment, a validation score is assigned to the classification of the test image, in which the value of the validation score depends on the relationship between the attributes that the neural network classified the test image as being associated with and the actual correct attributes of the test image. In some embodiments, the neural network may be designed to maximize or minimized the validation score, and the neural network can be encouraged to exhibit the desired classification behavior through design of the validation scoring scheme. In certain such embodiments, the validation score may include a penalty score given when the neural network provides an incorrect classification. For example, if an attribute determined by the neural network does not match the correct attribute, but the attribute determined by the neural network has a strong association with or is close to the correct attribute, a lower penalty score may be assigned. In such an example, the neural network may be designed to minimize penalty scores.

In various embodiments, the models used to determine the attributes associated with the item for consumption based on the user-provided image may include various feature detection and image recognition techniques. For example, in some embodiments, image and text recognition can include sub-processes such as feature extraction and feature matching. Images and text in the real world come in many colors, shapes, font types that can be skewed, blurry, of different sizes, and the like. Feature extraction techniques include various approaches to detect and define characteristics of an image or segments of an image. The output of such techniques can sometimes be referred to as feature descriptors or signatures. Features herein are not limited to computer vision features, but also include other types of features such as product's features, colors, shapes etc. Features can be local (i.e., describe discrete portions of an image) or global (i.e., represent the entire image). In local feature extraction, processes can include approaches to segment the image. Such approaches can be based on active contours (e.g., snakes, scissors, level sets), graph-based merging (e.g., watershed, divisive clustering, agglomerative clustering, graph-based segmentation, probabilistic aggregation), mean shift and mode finding (e.g., k-means and mixtures of Gaussians), normalized cuts, graph cuts, etc. Product image features can be extracted globally or locally according to color, texture, shape, other salient features, or some combination thereof. Feature extraction based on color can involve calculating histograms for the color elements of an image (e.g., red, green, and blue intensities). Texture features include the granularity and repetitive patterns of surfaces within an image. For example, glass, brick, and wood differ in texture, smoothness as well as pattern, and such characteristics can be used to describe an image or regions of the image. Texture features can be extracted according to co-occurrence matrices, Tamura's features (e.g., coarseness, contrast, directionality, line-likeness, regularity, roughness), Wold features (e.g., periodicity, randomness, and directionality), Gabor filtering, wavelet transforms, etc. Shape features for an image can be extracted according to aspect ratio, circularity, Fourier descriptors, moment invariants, consecutive boundary segments, etc. Other salient features include edges (extracted using, e.g., Canny edge detection), corners (extracted using, e.g., Harris corner detection or Smallest Univalue Segment Assimilating Nucleus (SUSAN) corner detection), regions of interest (extracted using, e.g., LaPlacian of Gaussian pyramids or Difference of Gaussian pyramids), or some combination and/or variation thereof, such as Scale Invariant Feature Transform (SIFT) features.

Various feature matching methods can be used to assess the similarity between images. Similarity measures can depend on the feature descriptors or signatures selected from an image. In one embodiment, similarity measures include the Minkowski distance or the Mahalanobis distance. The Minkowski distance may be appropriate where feature vectors are independent and each feature vector is of equal importance. In another embodiment, similarity measures include the Quadratic Form distance, the Kullback-Leibler divergence, the Jeffrey divergence, the Hausdorff distance, the Mallows distance, the earth mover's distance, the integrated region matching distance, or variations thereof. Certain embodiments may use various indexing structures or techniques for efficiently searching the image database, including multi-dimensional hashing, which maps feature descriptors into fix-sized bins or buckets based on some function applied to each descriptor vector; locality sensitive hashing, which uses unions of independently computed hashing functions to index features; multi-dimensional search trees such as k-d trees, which divide the multi-dimensional feature space along alternating axis-aligned hyperplanes to maximize search tree balance; etc. When there are hypothetical or putative matches, techniques such as geometric alignment can be used to verify which matches are inliers and which ones are outliers. In some instances, the entire query image can be expected to be translated or rotated to match an image in the database image such that the query image can be geometrically transformed to keep only those feature matches that are sufficiently close to the estimated transformation. Processes such as random consensus sampling (RANSAC) or least median of squares (LMS) can be used for verification.

In some embodiments, image and text processing processes may include sub-processes such as, for example, thresholding (converting a grayscale image to black and white, or using separation based on a grayscale value), segmentation, blob extraction, pattern recognition, barcode and data matrix code reading, gauging (measuring object dimensions), positioning, edge detection, color analysis, filtering (e.g. morphological filtering) and template matching (finding, matching, and/or counting specific patterns). Various techniques (e.g., OCR and other text recognition processes) can be used as the primary image and text analysis technique or to enhance other processes.

In various embodiments, the image analysis service 518 may provide image recognition for a visual search application as well as an augmented reality application, among other applications. Thus, the environment 504 may optionally include a visual search service 522, an augmented reality service 524, or both. In various embodiments of a visual search application, after the object of interest in the scene has been identified and object recognition techniques have been performed to extract certain feature data associated with the object, the feature data can be used to identify products in an electronic catalog that are visually similar to the object of interest. This may be performed through various techniques. For example, in some embodiments, a K-Nearest Neighbors (KNN) technique may be employed, in which a feature vector of the object of interest may be compared to feature vectors of products (i.e., product images) in the electronic catalog, and a measure of visual similarity between the object of interest and a product is determined based on a distance between their respective feature vectors. The products may then be ranked and/or selected as search results based on the determined visual similarity. This is illustrated in FIG. 2B, which illustrates an example interface of the computing device providing search results based on the captured image of the object, in accordance with various embodiments. In various embodiments of an augmented reality product view application, after a surface or space in scene is identified through image recognition, a graphical rendering of a product may be generated and superimposed onto a system or user selected position of the scene. For example, the graphical rendering of the product may be sized in proportion to other objects in the scene and positioned to provide the illusion the object being placed on a certain surface in the scene. In some embodiments, a user may drag the graphical rendering of the product to place it in different positions or turn the graphical rendering to view different angles of the product. Thus, the size, position, or viewing angle of the graphical rendering of the product may change according to the user input.

The visual status service 526 detects what the state of the image recognition process is, which includes both the image analysis service and the visual search or augmented reality service. The visual status service then determines the behavior of an onscreen body of visual markers based on the state as a visual indicator to the user regarding the state of the image recognition process. The body of visual markers may be displayed on the screen of the computing device 502 overlayed on the live camera view or still image, such as shown in FIGS. 4A-4F, for example. The image analysis service 518, or other services and/or components of the environment might access one or more data stores, such as a user data store 520 that contains information about the various users, and one or more content repositories 514 storing content able to be served to those users. For example, the user data store 516 may store data about individual users, including information regarding interests, demographic characteristics, user preferences, clothing sizes, spending behavior, browsing behavior, among others.

Figure 6:
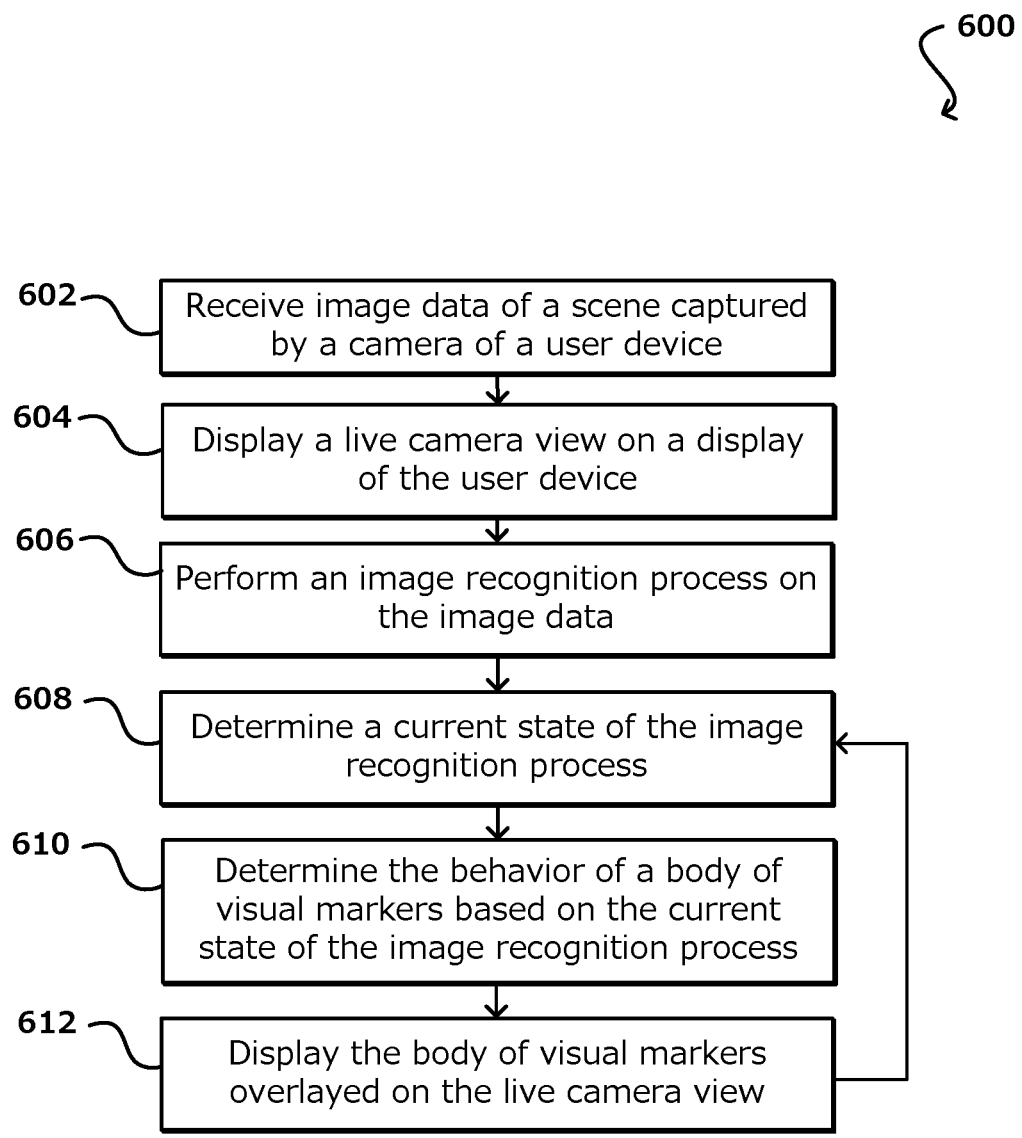
FIG. 6 illustrates a flow diagram describing an example process for providing visual feedback of image recognition process states, in accordance with various embodiments.

FIG. 6 illustrates a flow diagram 600 describing an example process for providing visual feedback of image recognition process states, in accordance with various embodiments. It should be understood that, for any process discussed herein, there can be additional, fewer, or alternative steps performed in similar or alternative orders, or in parallel, within the scope of the various embodiments. In this example, image data of a scene captured by a camera of a user device is received 602. In some embodiments, the image data may be received by a processor of the user device or a remote server communicative with the user device. The image data may be obtained from a live camera view, which is displayed 604 on a display of the user device. An image recognition process, such as a visual search process, an augmented reality process, or other image based analysis application, may be performed 606 on the image data. The image recognition process may go through several possible states, such as initialization, searching for image features, unstable frame, poor lighting, searching catalog, network connectivity issues, among others. Thus, a current state of the image recognition process may be determined 608, and the behavior of a body of visual markers may be determined 610 based on the current state of the image recognition process. The body of visual markers is then displayed 612 overlayed on the light camera view exhibiting the determined behavior. In some embodiments, the body of visual markers can be configured to exhibit a plurality of possible behaviors that correspond to the plurality of possible states. Thus, the body of visual markers exhibiting a certain behavior indicates a certain state of the image recognition process. In some embodiments, as the state of the image recognition process changes, or transitions from one state to another state, the body of visual markers transitions from one behavior to another behavior, accordingly. In some embodiment, the transition between visual marker behaviors is animated and seamless.

Figure 7:
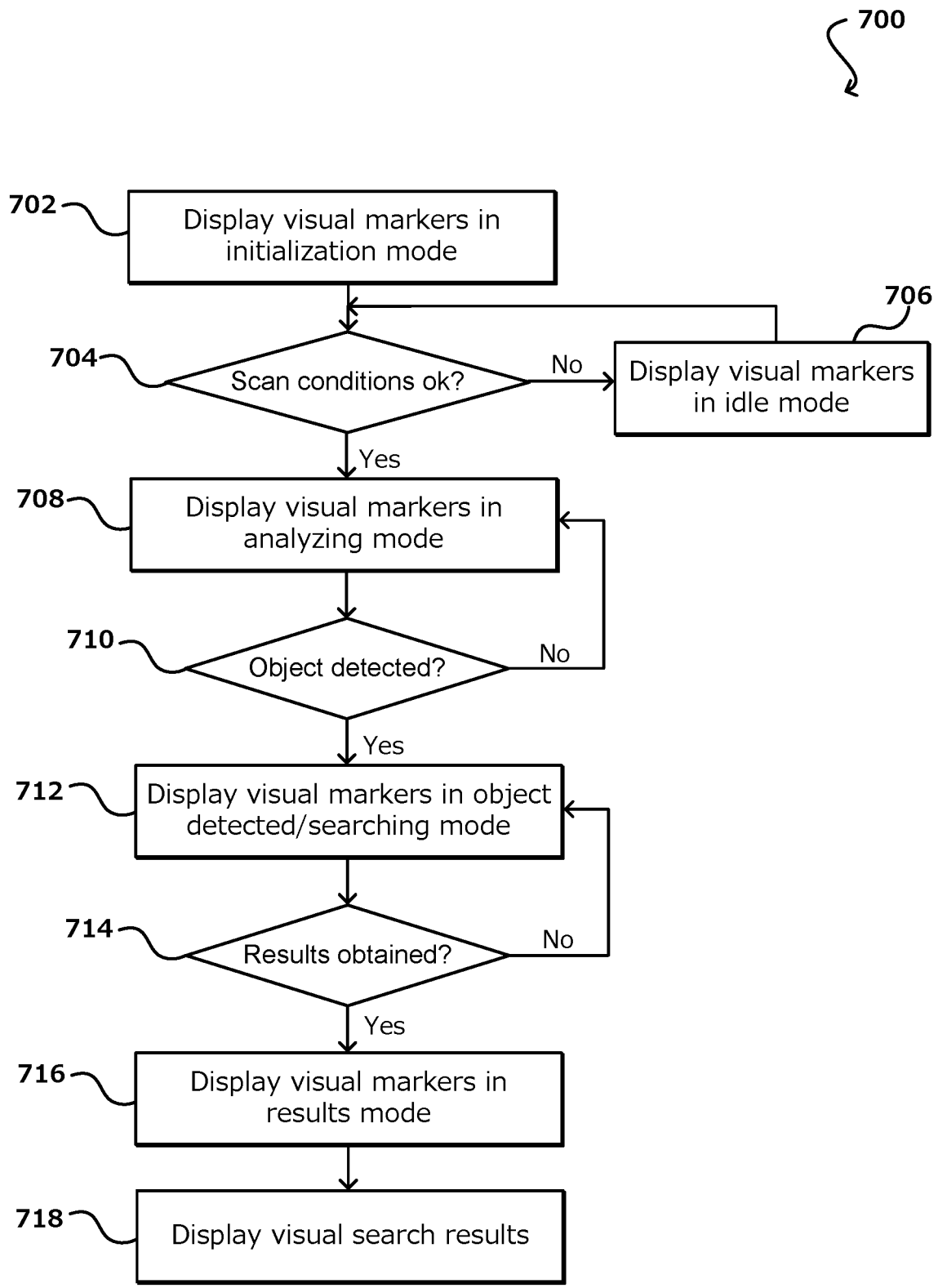
FIG. 7 illustrates a flow diagram describing a visual search process with visual feedback via visual marker behaviors, in accordance with various embodiments.

FIG. 7 illustrates a flow diagram 700 describing a visual search process with visual feedback via visual marker behaviors, in accordance with various embodiments. In this example, upon initiating a camera function of the visual search process, visual markers are displayed 702 on the display of a user device in an initialization mode. In an example embodiment, this includes animation of the visual markers flying onto the screen from the edges of the interface. It may then be determined 704 whether the scanning conditions are acceptable for image analysis. For example, this may include checking that the frame is stable, lighting is adequate, and the like. If the conditions are not acceptable for image analysis, the visual markers may provide visual indication of such by being displayed 706 in an idle mode, such as illustrated in FIG. 4A. If the conditions are acceptable, then the system can analyze the image. Accordingly, the visual markers are displayed 708 in an analyzing mode to provide visual indication that the image is being analyzed. It may then be determined 710 whether an object is detected. If an object is not detected during the analysis, then the image data continues to be analyzed and the visual markers continue to be displayed 708 in the analyzing mode. If an object is detected, then the visual markers are displayed 712 in an object detected and/or searching mode, as illustrated in FIG. 4B, which indicates that the object has been detected and a database is being searched for visually similar images. It is then determined 714 if search results are obtained. If results are not yet obtained, then the visual markers continue to be displayed 712 in the object detected and/or searching mode. If the results are obtained, the visual markers may be displayed 716 is a results mode. In some embodiments, in the results mode, the visual markers may be animated as flying off screen as the search results come onto the screen as the search results are displayed 718.

Figure 8:
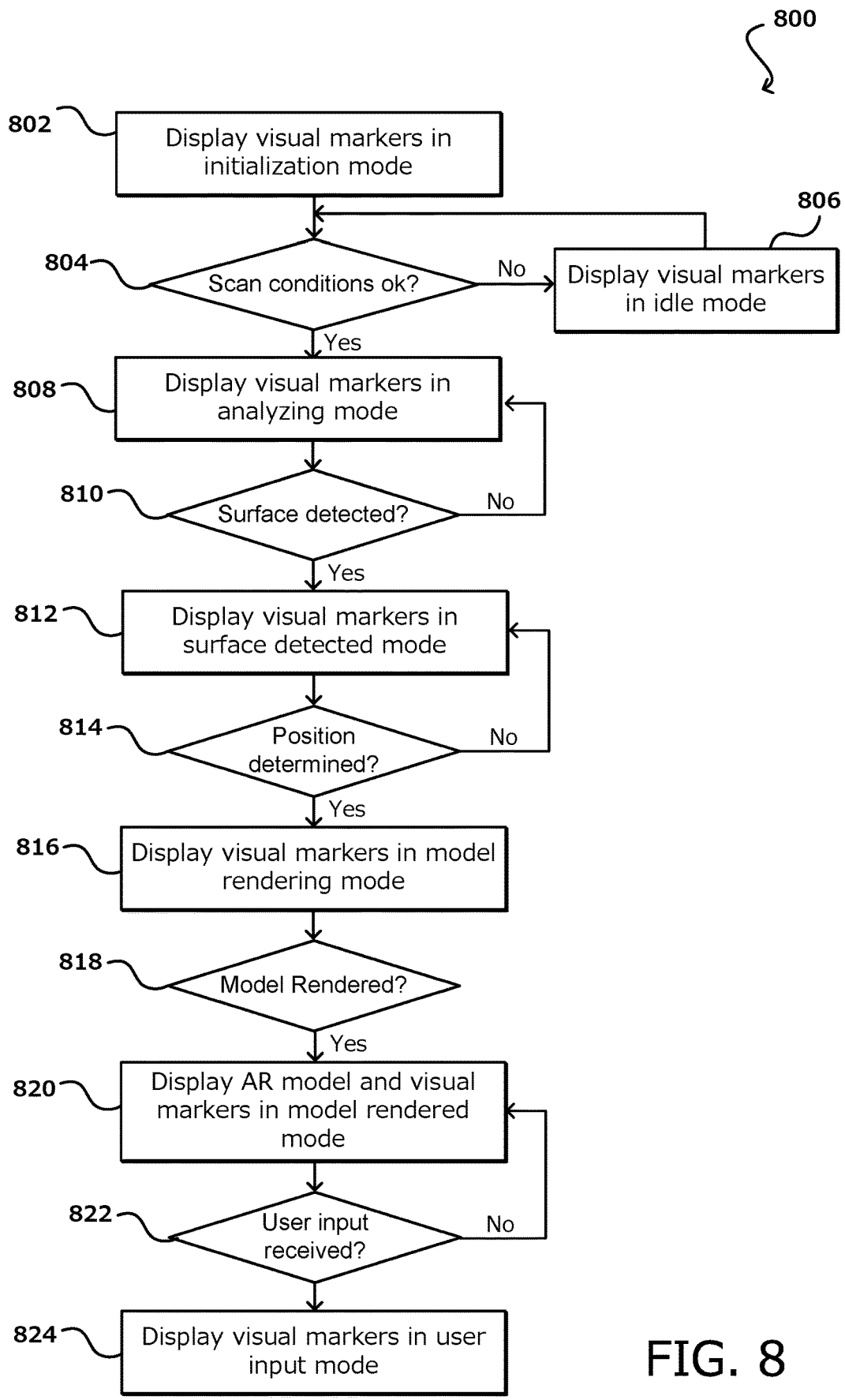
FIG. 8 illustrates a flow diagram describing an augmented reality process with visual feedback via visual marker behaviors, in accordance with various embodiments.

FIG. 8 illustrates a flow diagram describing an augmented reality process with visual feedback via visual marker behaviors, in accordance with various embodiments. In this example, upon initiating a camera function of the augmented reality process, visual markers are displayed 802 on the display of a user device in an initialization mode. In an example embodiment, this includes animation of the visual markers flying onto the screen from the edges of the interface. It may then be determined 804 whether the scanning conditions are acceptable for image analysis. For example, this may include checking that the frame is stable, lighting is adequate, and the like. If the conditions are not acceptable for image analysis, the visual markers may provide visual indication of such by being displayed 806 in an idle mode, such as illustrated in FIG. 4A. If the conditions are acceptable, then the system can analyze the image. Accordingly, the visual markers are displayed 808 in an analyzing mode to provide visual indication that the image is being analyzed. It is then determined 810 whether a surface is detected. If a surface (or a space) is not detected during the analysis, then the image data continues to be analyzed and the visual markers continue to be displayed 808 in the analyzing mode. If a surface is detected, then the visual markers are displayed 812 in a surface detected mode, such as illustrated in FIG. 4E. It may then be determined 814 whether a position on the detected surface for placing the augmented reality model has been determined. The position may be determined based on a user input or automatically selected. If a position is determined, the augment reality model may start to be rendered, and thus the visual markers are displayed 816 in a model rendering mode, such as illustrated in FIG. 4F. It is then determined 818 whether the model is fulled rendered. if the model is fully rendered, then the visual indicators are displayed 820 in a rendered mode. In some embodiments, a user input may be received. Thus, it is determined 822 whether a user input is received. If a user input is received, the visual markers may be displayed in a user input mode. In some embodiments, when the visual markers are displayed 824 in a user input mode, the body of visual markers may travel to a point on the screen where the user touched, such as a region of the interface. The visual markers may display certain patterns based on the type of user input.

Figure 9:
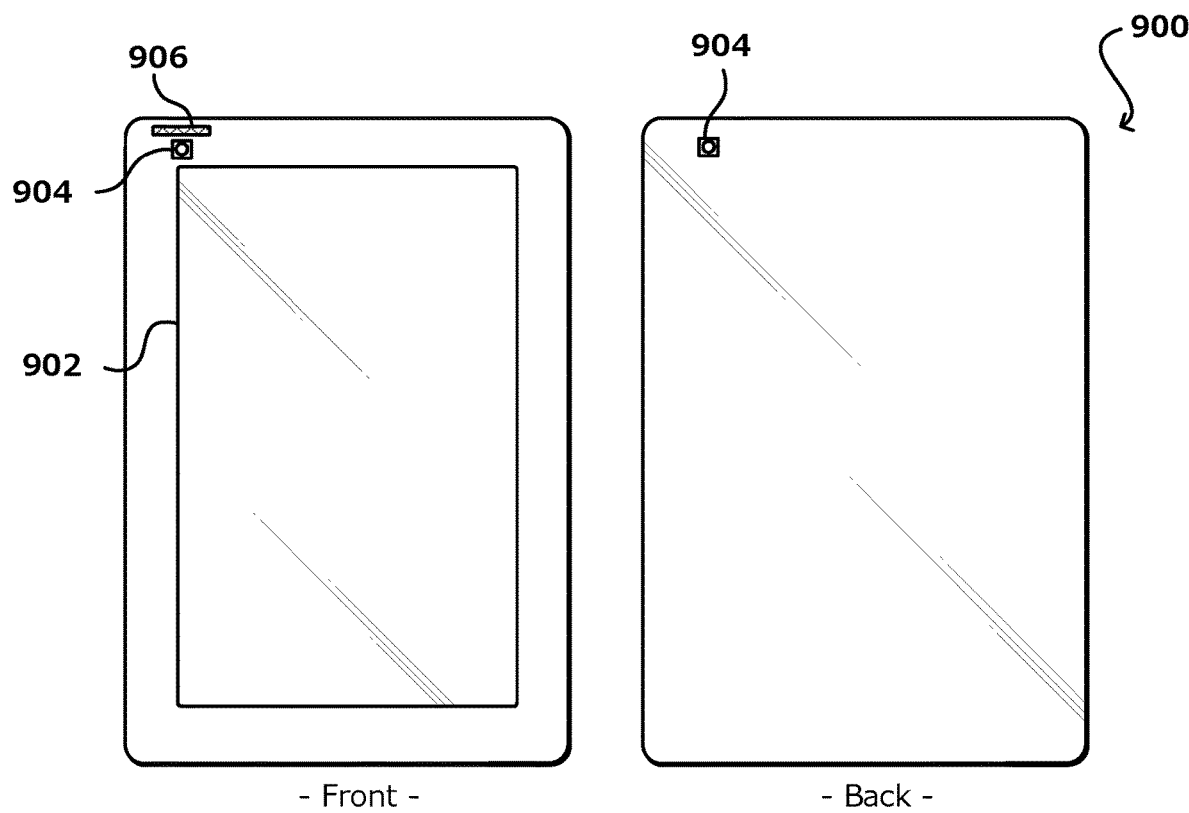
FIG. 9 illustrates an example computing device that can be used, in accordance with various embodiments of the present disclosure.

FIG. 9 illustrates an example computing device 900 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 900 has a display screen 902, which under normal operation will display information to a user facing the display screen (e.g., on the same side of the computing device as the display screen). The computing device in this example can include one or more media capture elements, in this example including one image capture element 904 on the back side of the device, although it should be understood that image capture elements could also, or alternatively, be placed on the sides or corners of the device, and that there can be any appropriate number of capture elements of similar or different types. Each image capture element 904 may be, for example, a camera, a charge-coupled device (CCD), a motion detection sensor, or an infrared sensor, or can utilize any other appropriate image capturing technology. The computing device can also include at least one microphone or other audio capture element(s) capable of capturing other types of input data, as known in the art, and can include at least one orientation-determining element that can be used to detect changes in position and/or orientation of the device. Various other types of input can be utilized as well as known in the art for use with such devices.

Figure 10:
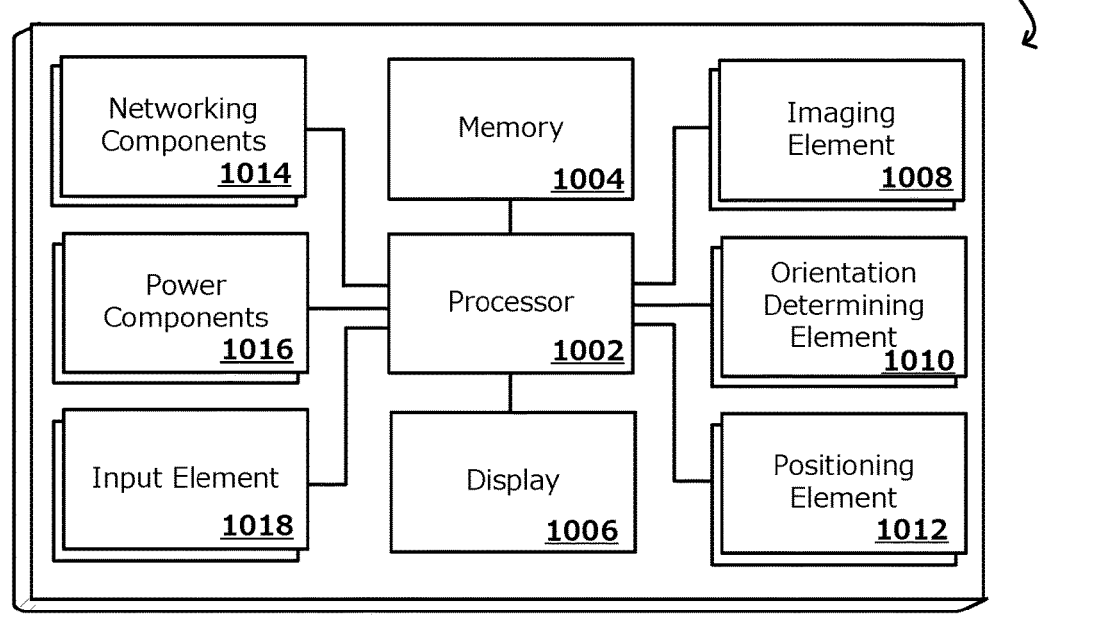
FIG. 10 illustrates a set of example components of one or more devices of the present disclosure, in accordance with various embodiments of the present disclosure.

FIG. 10 illustrates a set of example components of one or more devices 1000 of the present disclosure. In this example, the device includes at least one processor 1002 for executing instructions that can be stored in a memory device or element 1004. As would be apparent to one of ordinary skill in the art, the device can include many types of memory, data storage or computer-readable media, such as a first data storage for program instructions for execution by the processor 1002, the same or separate storage can be used for images or data, a removable memory can be available for sharing information with other devices, and any number of communication approaches can be available for sharing with other devices. The device typically will include some type of display element 1006, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 1008, such as at least one ambient light camera that is able to image a user, people, or objects in the vicinity of the device. An image capture element can include any appropriate technology, such as a CCD image capture element having a sufficient resolution, focal range and viewable area, to capture an image of the user when the user is operating the device. Methods for capturing images or video using an image capture element with a computing device are well known in the art and will not be discussed herein in detail. It should be understood that image capture can be performed using a single image, multiple images, periodic imaging, continuous image capturing, image streaming, etc.

The device can include one or more networking components 1014 enabling the device to communicate with remote systems or services such as content providers and rights determining systems. These components can include, for example, wired or wireless operable to communicate over a network such as a cellular network, local area network, or the Internet. The device can also include at least one additional input element 1018 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device. The device may also include one or more power components 1016, such as a battery. The device may also include one or more orientation determining elements 1010 and one or more positioning elements 1012. As discussed, different approaches can be implemented in various environments in accordance with the described embodiments.

Figure 11:
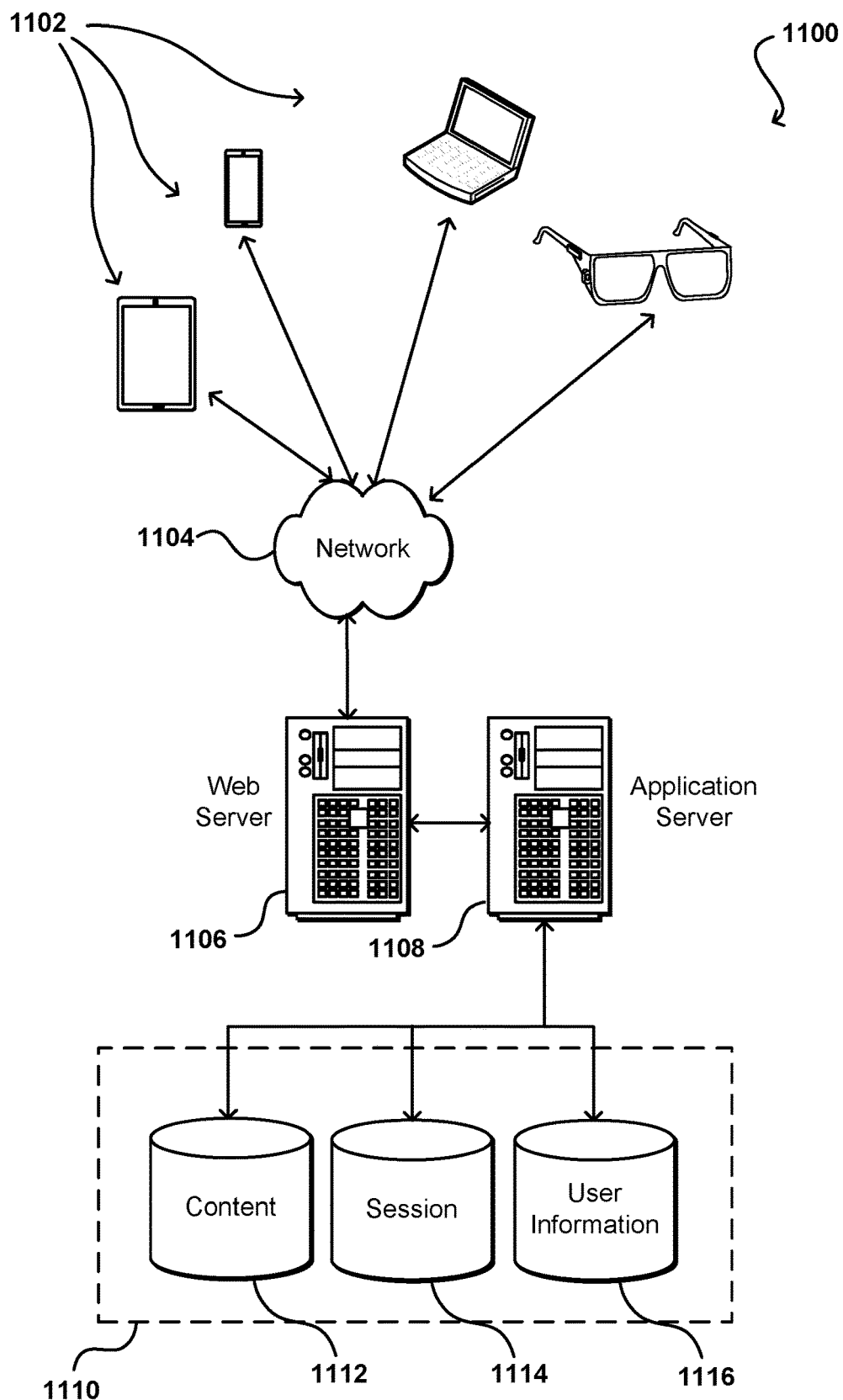
FIG. 11 illustrates an example environment for implementing aspects, in accordance with various embodiments of the present disclosure.

FIG. 11 illustrates an example environment 1100 for implementing aspects in accordance with various embodiments. As will be appreciated, although a Web-based environment is used for purposes of explanation, different environments may be used, as appropriate, to implement various embodiments. The system includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1106 for receiving requests and serving content in response thereto, although for other networks, an alternative device serving a similar purpose could be used, as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. As used herein, the term data "store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1106 in the form of HTML, XML or another appropriate structured language in this example. The handling of all requests and responses, as well as the delivery of content between the client device 1102 and the application server 1108, can be handled by the Web server 1106. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing content (e.g., production data) 1112 and user information 1116, which can be used to serve content for the production side. The data store is also shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof. In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc. Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
    at least one computing device processor;
    a camera;
    a display; and
    a memory device including instructions that, when executed by the at least one computing device processor, cause the system to:
        capture image data using the camera, the image data including a representation of a scene;
        display the representation of the scene on the display;
        perform at least a portion of an image recognition process on the image data, the image recognition process having a plurality of possible states including an initialization state, a detected state, and a plurality of additional states;
        determine a current state of the image recognition process;
        display a body of animated visual markers superimposed on the representation of the scene, the body of animated visual markers having a plurality of possible behaviors corresponding respectively to the plurality of possible states;
        determine a behavior for the body of animated visual markers based at least in part on the current state, the behavior indicative of the current state; and
        update the behavior of the body of animated visual markers based at least in part on a change in the current state.

2. The system of claim 1, wherein the instructions when executed further cause the system to:
    perform image analysis on the image data for a visual search query;
    display the body of animated visual markers during the image analysis, the body of animated visual markers exhibiting behavior associated with and indicative of image analysis being performed;
    detect an object in the representation of the scene; and
    display the body of animated visual markers upon the object being detected, the body of animated visual markers exhibiting behavior associated with and indicative of the object having been detected.

3. The system of claim 1, wherein the instructions when executed further cause the system to:
    detect a surface in the representation of the scene for an augmented reality model;
    display, upon detecting the surface, the body of animated visual markers exhibiting behavior associated with and indicative of the detected surface;
    render an augmented reality model;
    display, during the rendering, the body of animated visual markers exhibiting behavior associated with and indicative of the rendering; and
    display, upon completing of the rending, the body of animated visual markers exhibiting behavior associated and indicative of completion of the rendering.

4. The system of claim 1, wherein the body of animated visual markers include a plurality of distinct graphical elements having an appearance, motion, physics, shape, opacity, or color based at least in part on the behavior.

5. A computer-implemented method, comprising:
    receiving image data including a representation of a scene;
    causing the representation of the scene to be displayed in a graphical interface on a display device;
    performing an image recognition process on the image data, the image recognition process associated with a plurality of states including a feature detected state and a plurality of additional states;

displaying a group of visual markers on the graphical interface;
determining a behavior for the group of visual markers based at least in part on a current state of the image recognition process, the behavior being one of a plurality of behaviors corresponding respectively to the plurality of states; and
changing the behavior of the visual marker based at least in part of a change in the current state.

6. The method of claim 5, further comprising:
displaying an animated transition of the group of visual markers from a previous behavior associated with a previous state to the behavior associated with the current state.

7. The method of claim 5, further comprising:
performing an augmented reality process using the representation of the scene, the augmented reality process associated with at least a subset of the plurality of states;
displaying a group of visual markers overlayed on the representation of the scene, the behavior of the group of visual markers based at least in part on the current state of the augmented reality process; and
updating the behavior of the group of visual markers based at least in part on a change in the current state of the augmented reality process.

8. The method of claim 5, further comprising:
performing an image-based search process using the representation of the scene, the image-based search process associated with at least a subset of the plurality of states;
displaying a group of visual markers overlayed on the representation of the scene, the behavior of the group of visual markers based at least in part on the current state of the image-based search process; and
updating the behavior of the group of visual markers based at least in part on a change in the current state of the image-based search process.

9. The method of claim 5, further comprising:
receiving a user input; and
determining the behavior for the group of visual markers based at least in part on the user input.

10. The method of claim 5, wherein a mapping between the plurality of states and the plurality of behaviors is consistent across a plurality of different scene types or image recognition processes.

11. The method of claim 5, wherein the plurality of states includes at least one of a stage in a scanning process, a scene type, or an object type.

12. The method of claim 5, further comprising:
determining that the current state of the image recognition process is an idle state, wherein the image data is inadequate for the image recognition process; and
displaying the group of visual markers exhibiting an idle state behavior, the idle state behavior indicative of the image recognition process being in the idle state.

13. The method of claim 5, further comprising:
determining that the current state of the image recognition process is a guidance state, wherein a user input is requested; and
displaying the group of visual markers exhibiting a guidance state behavior, the guidance state behavior indicative of the requested user input.

14. The method of claim 5, further comprising:
determining that the current state of the image recognition process is an error state, wherein a connectivity or system issue is detected; and
displaying the group of visual markers exhibiting an error state behavior, the error state behavior indicative of the image recognition process being in the error state.

15. The method of claim 5, further comprising:
determining that the current state of the image recognition process is an image analysis state, wherein the image data is being analyzed; and
displaying the group of visual markers exhibiting an image analysis state behavior, the image analysis state behavior indicative of the image data being analyzed.

16. The method of claim 5, further comprising:
determining that the current state of the image recognition process is an object detected state, wherein a representation of an object has been detected from the image data; and
displaying the group of visual markers exhibiting an object detected state behavior, the object detected state behavior indicative of the representation of the object having been detected.

17. A system, comprising:
at least one computing device processor; and
a memory device including instructions that, when executed by the at least one computing device processor, cause the system to:
receiving image data including a representation of a scene;
causing the representation of the scene to be displayed in a graphical interface on a display device;
performing an image recognition process on the image data, the image recognition process associated with a plurality of states including a feature detected state and a plurality of additional states;
displaying a group of visual markers on the graphical interface;
determining a behavior for the group of visual markers based at least in part on a current state of the image recognition process, the behavior being one of a plurality of behaviors corresponding respectively to the plurality of states; and
changing the behavior of the visual marker based at least in part of a change in the current state.

18. The system of claim 17, wherein the instructions when executed further cause the system to:
displaying an animated transition of the group of visual markers from a previous behavior associated with a previous state to the a behavior associated with the current state.

19. The system of claim 17, wherein the instructions when executed further cause the system to:
performing an augmented reality process using the representation of the scene, the augmented reality process associated with at least a subset of the plurality of states;
displaying a group of visual markers overlayed on the representation of the scene, the behavior of the group of visual markers based at least in part on the current state of the augmented reality process; and
updating the behavior of the group of visual markers based at least in part on a change in the current state of the augmented reality process.

20. The system of claim 17, wherein the instructions when executed further cause the system to:
performing an image-based search process using the representation of the scene, the image-based search process associated with at least a subset of the plurality of states;

displaying a group of visual markers overlayed on the representation of the scene, the behavior of the group of visual markers based at least in part on the current state of the image-based search process; and updating the behavior of the group of visual markers based at least in part on a change in the current state of the image-based search process.

\* \* \* \* \*